United States Patent [19]
Young

[11] 4,083,441
[45] Apr. 11, 1978

[54] CLUTCH ASSEMBLY
[75] Inventor: Robert G. Young, Bird-in-Hand, Pa.
[73] Assignee: Sperry Rand Corporation, New Holland, Pa.
[21] Appl. No.: 718,708
[22] Filed: Aug. 30, 1976
[51] Int. Cl.² .................. F16D 11/00; B65G 57/00
[52] U.S. Cl. ................................. 192/28; 214/6 B
[58] Field of Search ................... 192/28, 29; 214/6 B

[56] References Cited
U.S. PATENT DOCUMENTS

| 3,129,654 | 4/1964 | Locker et al. | 192/28 X |
| 3,275,110 | 9/1966 | Lasky | 192/28 |
| 3,862,692 | 1/1975 | Butler | 214/6 B |

Primary Examiner—Leonard H. Gerin
Attorney, Agent, or Firm—John B. Mitchell; Frank A. Seemar; Joseph A. Brown

[57] ABSTRACT

An improved clutch assembly includes a rotatable driving clutch part having leading and trailing lug portions thereon and a coaxially rotatable driven clutch part. First and second adjacently-positioned pawl elements are mounted on the driven part for opposing pivotal movements between respective retracted and extended positions, being urged by respective springs to their respective extended positions. In their respective extended positions, the first pawl element is disposed for driving engagement with the leading lug portion while the second pawl element is disposed for engagement with the trailing lug portion so as to prevent any substantial amount of overrun of the driven clutch part relative to the driving clutch part. In their respective retracted positions, the first and second pawl elements are withdrawn from engagement with their respective lug portions. Interengageable means in the form of a pair of opposing ledges formed respectively on adjacent portions of the pawl elements insure that the second pawl element will pivot to its retracted position when the first pawl element is moved to its retracted position.

8 Claims, 4 Drawing Figures

CLUTCH ASSEMBLY

BACKGROUND OF THE INVENTION

1. Field of the Invention

The present invention relates generally to a clutch assembly for use in conjunction with a tying mechanism on a baler and, more particularly, is concerned with improvement of such clutch assembly to enhance the functioning of the tying mechanism.

2. Description of the Prior Art

A conventional baler has a fore-and-aft extending bale case within which a plunger is reciprocably driven through working and return strokes for forming a bale of crop material in the bale case. The baler also commonly has a tying mechanism mounted above the bale case and needle means mounted below the bale case, the latter being operable to carry strands of banding material upwardly through the bale case to the tying mechanism upon completion of formation of a bale in the bale case by the plunger.

The tying mechanism conventionally includes a main transverse rotatable drive shaft and a plurality of side-by-side tying units mounted therealong. The shaft is rotated through one revolution during each tying cycle. Each rotation of the shaft causes the needle means to be moved in and out of the bale case delivering the strands to the tying units and the latter to form a tie in each of the strands received from the needle means.

The reciprocation of the plunger and each rotation of the drive shaft are precisely timed so that the needle means is projected across and then retracted from the bale case and the tying operation is completed during the internal between the last working stroke of the plunger which completed the bale to be tied and the next successive working stroke of the plunger for starting the next bale.

For rotatably driving the tying mechanism drive shaft through one revolution during each tying cycle, a clutch assembly is ordinarily utilized, being mounted on one end of the drive shaft adjacent the tying units. The clutch assembly commonly includes a first clutch part drivingly connected to the shaft and an adjacently-positioned second clutch part rotatably journalled on the shaft and carrying a chain sprocket. A drive chain drivingly connects a power driven component of the baler to the sprocket so that the latter, together with the second clutch part connected thereto, is constantly driven. The first clutch part includes a pivotally mounted pawl element which is spring-loaded to move into driving engagement with a drive lug mounted on the constantly rotating second clutch part. However, as a bale is being formed in the bale case, a stop operatively interconnected to a bale length measuring mechanism on the bale case engages an outer end of the pawl element so as to retain the pawl element against its spring bias and at a retracted position out of the path of revolution of the drive lug on the second clutch part. With the pawl element held at its retracted position, the clutch parts are disengaged and the first clutch part and the drive shaft both remain stationary.

Once the bale is completed to a predetermined length, the bale length measuring mechanism causes the stop to release from the pawl element, whereby the pawl element due to its spring bias pivots into the revolution path of the drive lug on the second clutch part. A drive connection is then formed between the first and second clutch parts by the engagement of the pawl element of the former with the drive lug on the latter. The first clutch part, and therewith the shaft, rotate with the second clutch part, but only through one complete rotation cycle. At the end of the single rotation cycle, the stop, which had automatically moved back into the path of the pawl element after the pawl element was released and moved past the stop, engages and causes the pawl element to pivot back to its retracted position which disengages the first clutch part from the second clutch part and thereby ceases rotation of the first clutch part and consequently rotation of the drive shaft.

Concurrently, with each single rotation cycle of the first clutch part and the drive shaft, a lever arm fixed to the first clutch part and another lever arm fixedly mounted to the other end of the shaft are rotated in unison therewith and through interconnecting linkages drivingly move the needle means through a complete cycle which brings the same through the bale case to deliver the strands to the tying units and then withdraws the needle means from the bale case back to its rest or home position. Also, concurrently, with each single rotation cycle of the drive shaft, components of the tying units are operated to form ties in the banding strands delivered thereto by the needle means.

Over the past years, the above-described clutch assembly as proven to be an effective means for driving the needle means and operating the tying units during each tying cycle in a precise timed relation with the reciprocation of the plunger. However, with more recent baler models, the plunger speed has been increased to ninety or more strokes per minute. Consequently, the needle means and the components of the tying units must correspondingly move and operate at higher rates.

Under such conditions, when the pawl element of the first clutch part engages the moving drive lug of the rotating second clutch part, an initial high peak starting load is exerted on the first clutch part and the drive shaft in order to initiate movement of the needle means and operation of the tying unit components. Once rotation of the first clutch part and the drive shaft begins, and therewith movement of the needle means and operation of the tying unit components, the accelerating momentum imparted thereto soon causes the first clutch part and shaft to rotate faster than the second clutch part, whereby the pawl element of the first clutch part overruns or advances out of engagement with the drive lug on the second clutch part. However, the drive lug on the second clutch part soon catches up with the pawl element of the first clutch part after the initial starting momentum imparted to the needle means and tying unit components has dissipated. When the drive lug catches up to the pawl element and engages the same again, a second peak load condition is exerted by the second clutch part on the first clutch part and drive shaft before the end of the tying cycle is reached. These successive peak loading and overrun conditions are reflected by a momentary hesitation in the movement of the needle means and in the operation of the tying units during each tying cycle. Such conditions cause increased wear on the drive shaft and components of the tying units operatively associated therewith and ultimately may result in tying malfunctions.

SUMMARY OF THE INVENTION

The present invention provides an improved clutch assembly having novel components which substantially limit the overrun of the driven clutch part relative to the driving part such that the deleterious consequences which ordinarily result therefrom are avoided or at least greatly minimized.

Accordingly, the present invention relates to an improved clutch assembly which, for instance, may be utilized on a baler although not only limited thereto in its possible applications. The clutch assembly includes a rotatable driving clutch part having leading and trailing lug portions thereon and a rotatable driven clutch part journalled coaxially with the driving clutch part. A first pawl element is provided being connected to the driven part for predetermined movement relative thereto between an extended position, wherein a portion of the first pawl element is disposed for engagement with the leading lug portion on the driving clutch part, and a retracted position, wherein the portion of the first pawl element is withdrawn from engagement with the leading lug portion on the driving clutch part. A second pawl element is also provided, being connected also to the driven clutch part for predetermined movement relative thereto between an extended position, wherein a portion of the second pawl element is disposed for engagement with the trailing lug portion on the driving clutch part, and a retracted position, wherein the portion of the second pawl element is withdrawn from engagement with the trailing lug portion on the driving clutch part. The clutch assembly further includes biasing means on the driven clutch part for urging the first and second pawl elements to their respective extended positions. When the first pawl element is at its retracted position, it, in turn, is operative to hold the second pawl element at the latter's retracted position.

More particularly, the first and second pawl elements have adjacently-positioned mounting portions at which the pawl elements are respectively journalled for opposite pivotal movement between their respective retracted and extended positions. Interengageable means are provided, preferably taking the form of a pair of opposed ledges provided on the respective mounting portions of the pawl elements. When the first pawl element is pivoted from its extended position to its retracted position, the ledge thereon engages and effectuates a camming action against the opposing ledge on the mounting portion of the second pawl element to cause the latter to oppositely pivot from its extended to retracted position. Furthermore, once the pawl elements reach their respective retracted positions, the first pawl element ledge stays engaged with the second pawl element ledge, whereby the first pawl element when held at its retracted position, in turn, holds the second pawl element at its retracted position.

Other advantages and attainments of the improved clutch assembly provided by the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand references are determined by facing in the direction of the arrow in FIG. 1, which is the same as the forward direction of travel of the hay baler upon which the improved clutch assembly of the present invention is mounted. Also, in the following description, it is to be understood that such terms as "forward," "rearward," "left," "upwardly," etc., are words of convenience and are not to be construed as limiting terms.

In General

Figure 1:
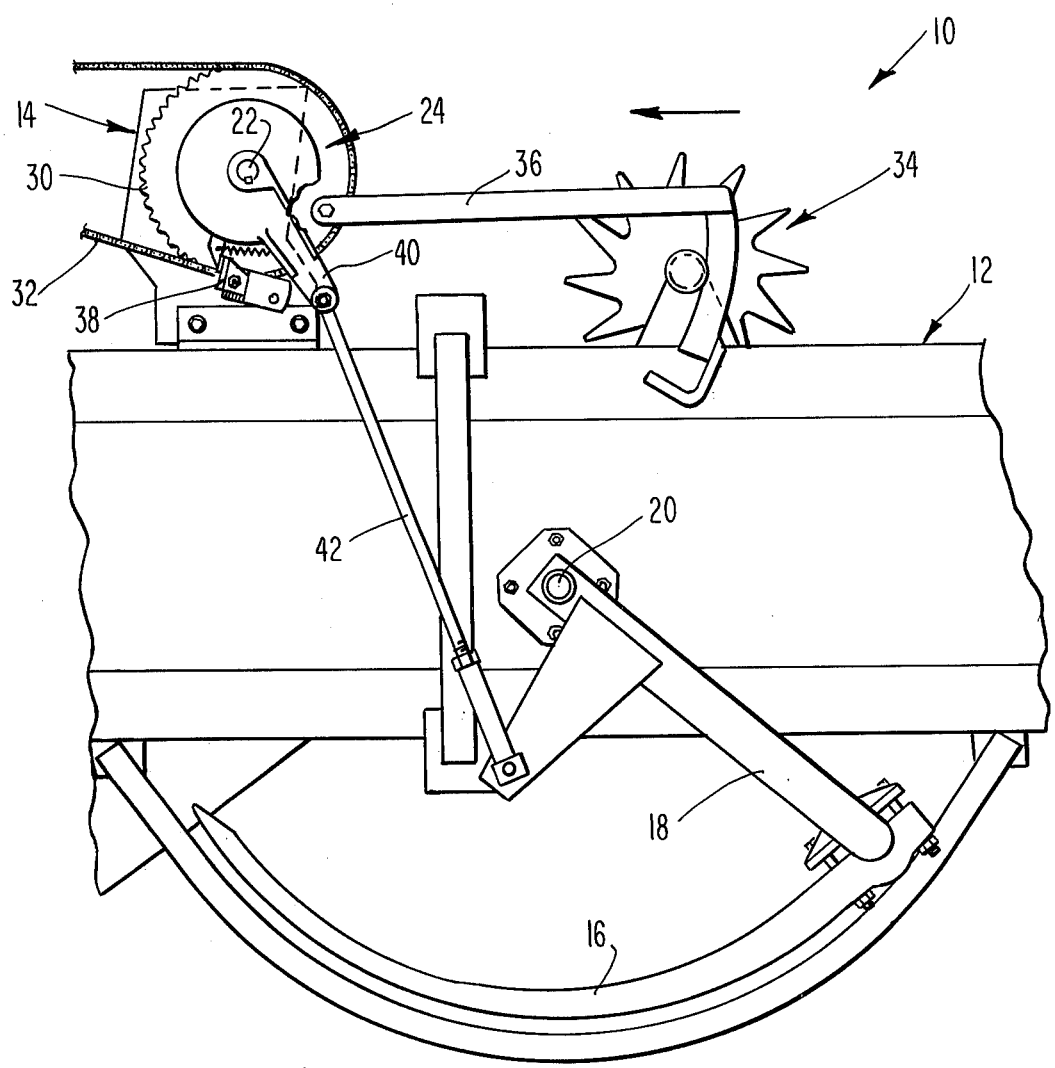
FIG. 1 is a fragmentary side elevational view of a baler bale case, showing the improved clutch assembly of the present invention on one end of a tying mechanism mounted above the bale case, a bale length measuring mechanism on the bale case rearwardly of the tying mechanism for controlling actuation of the clutch assembly and a yoke pivotally mounted on the bale case which carries a plurality of needles below the bale case and is drivingly interconnected to the clutch assembly.

Referring now to the drawings, and particularly to FIG. 1, there is fragmentarily shown a hay baler, being generally indicated by the numeral 10, having a bale case, an intermediate portion of which is shown and being indicated generally by numeral 12. The bale case 12 extends fore-and-aft on the baler and a plunger (not shown) is disposed therein which is reciprocably driven through rearward working and forward return strokes for forming a bale of crop material in the bale case 12.

A tying mechanism, fragmentarily shown and generally designated as 14, is mounted above the intermediate portion of the bale case 12 and a plurality of needles 16 (only the left one being seen in FIG. 1) are mounted below the bale case 12. The needles 16 are carried on a yoke 18 which is pivotally connected at 20 to the opposite sides of the bale case 12 (only the left pivotal connection being shown). Movement of the yoke 18 forwardly projects the needles 16 upwardly through the bale case 12 and delivers strands of banding material carried by the needles 16 to the tying mechanism.

The tying mechanism 14 conventionally includes a main transverse rotatably mounted drive shaft 22 and a plurality of side-by-side tying units (not shown) being mounted therealong having components to be driven by the shaft 22 upon rotation thereof for carrying out the tying operation. The shaft 22 is rotated through 360° during each tying cycle. Each rotation of the shaft 22 causes the needles 16 to be moved in and out of the bale case 12 delivering the strands to the tying units and the latter to form a tie in each of the strands received from the needles 16.

The reciprocation of the plunger and each rotation of the drive shaft 22 are precisely timed so that the needles 16 are projected across and then retracted from the bale case 12 and the tying operation is completed during the interval between the last rearward working stroke of the plunger which completed the bale to be tied and the next successive rearward working stroke of the plunger for starting the next bale in the bale case 12.

For rotatably driving the tying mechanism drive shaft 22 through one revolution during each tying cycle, a clutch assembly is ordinarily provided, being mounted on one end (the left end as illustrated herein) of the drive shaft 22 adjacent the tying units of the lying mechanism 14 and generally designated by numeral 24. The particular clutch assembly 24 being utilized is the improved clutch assembly which comprises the present invention, the novel combination of components of which will be described in detail later on.

Figure 2:
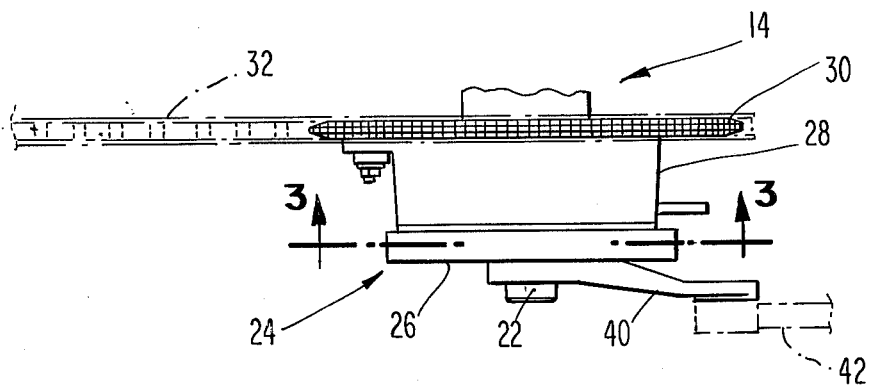
FIG. 2 is an enlarged fragmentary top plan view of the left end portion of the tying mechanism, showing the driving and driven parts of the improved clutch assembly.

As seen also in FIG. 2, the clutch assembly 24 conventionally includes an outer driven clutch part 26 which is secured to the shaft 22 for rotation therewith and an adjacently-positioned inner driving clutch part 28 which is rotatably journalled on the shaft 22 and carries a chain sprocket 30. A drive chain 32 drivingly connects a power driven component (not shown) of the baler to the sprocket 30 so that the latter and the driving clutch part connected thereto are constantly rotatably driven.

Conventionally, as illustrated and disclosed in greater detail in U.S. Pat. No. 3,129,654, a bale length measuring mechanism, generally designated 34, is mounted on the bale case 12 and has a forwardly-extending L-shaped trip arm 36 which is operatively interconnected to a pivotally mounted stop 38 for controlling engagement and disengagement of the driven clutch part 26 with the driving clutch part 28.

As a bale is being formed in the bale case 12, the stop 38 maintains the driven clutch part 26 disengaged from the driving clutch part 28, whereby the driven clutch part and the drive shaft 22 both remain stationary. However, once the bale is completed to a predetermined length, the trip arm 36 of the bale length measuring mechanism 34 causes the stop 38 to release the driven clutch part 26 whereby the latter 26 becomes engaged with the driving clutch part 28. The first clutch part 26, and therewith the shaft 22, then rotate with the second clutch part 28, but only through one complete rotation cycle. At the end of the single rotation cycle, the stop 38, which was pivoted back to its original position by the bale length measuring mechanism 34 just after the driven clutch part 26 became engaged with the driving clutch part 28, causes disengagement of the driven clutch part 26 from the driving clutch part 28 and thereby rotation of the driven clutch part 26 and the shaft 22 to cease.

Concurrently, with each single rotation cycle of the driven clutch part 26 and the drive shaft 22, a left lever arm 40 fixed to the driven clutch part 26 and a right lever arm (not shown) fixedly mounted to the other end (not shown) of the shaft 22 are rotated in unison therewith and respectively through a left connecting rod 42 and a right connecting rod (not shown) drivingly move the yoke 18 through a complete cycle which brings the needles 16 upwardly through the bale case 12 to deliver the strands to the tying units of the mechanism 14 and then withdraws the needles 16 from the bale case 12 back to their home position, as seen in FIG. 1. Also, concurrently with each single rotation cycle of the shaft 22, components of the tying mechanism are operated to form ties in the banding strands delivered thereto by the needles 16.

The conventional components of the baler 10 to the extent they have been described up to this point are generally similar to ones known in the prior art and therefore need not be described in any further detail for a complete and thorough understanding of the novel combination of components of the improved clutch assembly 24 constituting the present invention which will be described hereinafter.

The Improved Clutch Assembly

Figure 3:
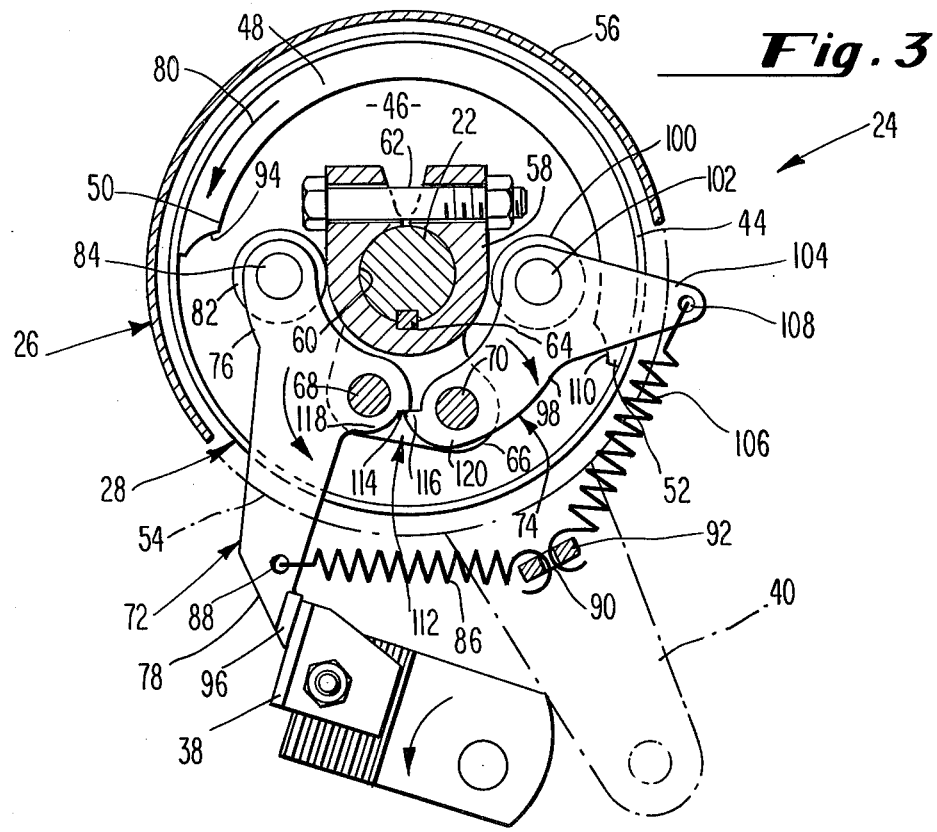
FIG. 3 is an enlarged left end elevational view, partly in section, taken along line 3—3 of FIG. 2, showing the parts of the clutch assembly in disengaged relation.
Figure 4:
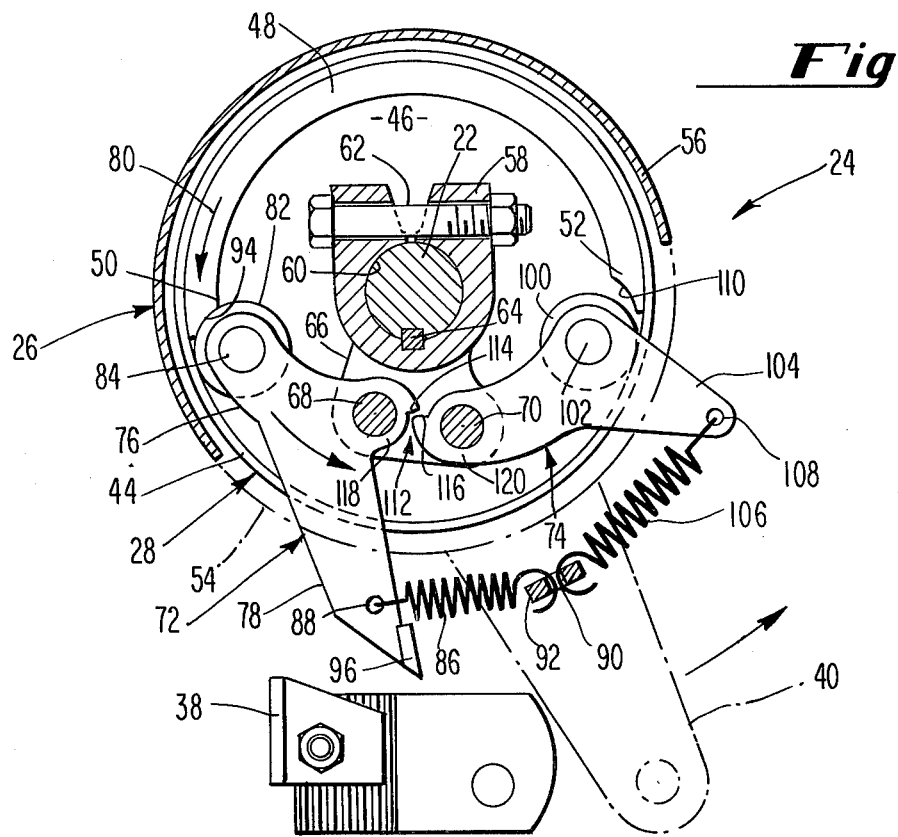
FIG. 4 is a view similar to that of FIG. 3, but showing the parts of the clutch assembly in engaged relation.

Referring now to FIGS. 3 and 4, there is illustrated the novel components for minimizing the amount of overrun which may occur between the parts of the clutch assembly 24. As described above, the clutch assembly 24 basically includes a driven clutch part 26 and a driving clutch part 28. While the clutch parts are both rotatable about the same axis, that being the one defined by the shaft 22, the driving clutch part 28 is rotatably journalled on the shaft 22 and the driven clutch part 26 is secured on the shaft 22 for rotation therewith. Therefore, at certain times the driving clutch part 28, which is constantly rotatably driven during use, will rotate relative to the driven clutch part 26 and the shaft 22 and at other times will rotate in unison therewith.

The driving clutch part 28, as described heretofore, is secured to the sprocket 30 and both are rotatably journalled on the shaft 22 by suitable bearing means (not shown). The part 28 has a rim 44 which encompasses the circumference of a circular inner wall 46 and extends outwardly therefrom. A drive segment 48 is fixed about approximately one-half of the circumference of the inner periphery of the rim 44 of the driving clutch part and has a leading lug portion 50 and a trailing lug portion 52.

The driven clutch part 26 includes an outer generally circular wall 54 (FIG. 1) to which the lever arm 40 is integrally connected and an annular flange 56 which extends about slightly more than one-half the circumference of the outer wall 54 and inwardly thereof. Also, a hub 58 is integrally connected with a central portion of the outer wall and extends inwardly therefrom. The hub 58 has a central bore 50 formed therethrough which receives the left end of the drive shaft 22. The hub 58 is clamped to the shaft 22 by bolt 62 and keyed to the shaft 22 at connection 64. An ear 66 is connected to a side of the hub 58 and extends radially therefrom in spaced relation to the outer wall 54 of the clutch part 26. The ear 66 has a pair of spaced apart apertures formed therethrough which are aligned with another pair of apertures (not shown) formed in the outer wall 54 and together carry two pivot pins 68,70 for rockably supporting first and second pawl elements 72,74. The pivot pins 68,70 define respective pivotal axes for the pawl elements 72,74 which extend parallel to the axis of the shaft 22.

The first pawl element 72 has a drive arm 76 and a control arm 78. The control arm 78 extends generally radially relative to the axis of pivot pin 68 and the drive arm 76 extends in a direction generally counter to the direction of rotation of the second clutch part 28 as indicated by the arrow 80. The pivot pin 68 mounts the first pawl element 72 on the driven clutch part ear 66 for movement with the driven clutch part 26 and also for pivotal or rocking movement relative thereto. The first pawl element 72 also has a roller 82 rotatably mounted on the outer end of its drive arm 78 by a pin 84.

The first pawl element 72 is normally urged to an extended position, as seen in FIG. 4, by a spring 86 which is looped at one end through an opening 88 in the control arm 78 and at an opposite end is looped through a hole 90 in an inwardly projecting tab 92 fixed on the lever arm 40. At the extended position, the roller 82 is disposed radially outwardly from the axis of the shaft 22 in the path of the leading lug portion 50 on the driving clutch part 28. In such position, driving engagement occurs between an arcuate front surface 94 on the leading lug portion 50 and a side of the roller 82 such that the driven clutch part 26 is rotated with the driving clutch part 28. However, when the stop 38 is disposed in the path of revolution of a segment 96 on the outer end of the control arm 78, it engages the same and holds the first pawl element 72 at a retracted position, as seen in FIG. 3, against the biasing of the spring 86. At the retracted position, the roller 82 on the drive arm 76 is disposed radially inwardly toward the axis of the shaft 22 and withdrawn or clear from any possible engagement with the arcuate surface 94 on the leading lug portion 50 such that the driven clutch part 26 is held stationary. Limits upon the angular or rocking movement of the first pawl element 72 relative to the driven clutch part 26 are established on the one hand by the hub 58, which limits radially inward movement of the pawl element 72, and on the other hand by the inner periphery of the rim 44 of the driving clutch part 28.

It will be understood that driving engagement between the clutch parts 26,28 will continue so long as the first pawl element 72 occupies the extended position in which its roller 82 is engaged by the leading lug portion surface 94. Since the pawl element 72 is held in the extended position primarily by the tension in the spring 86 and the components of forces involved in the shape of the leading lug portion surface 94 and the roller 82, the length of the drive arm 76 and the position of pivot pin 68, it will be readily seen that the pivotal stop 38 when interposed in the path of the control arm 78 as it revolves with the first clutch part 26 will cause the pawl element 72 to pivot to its retracted position. In the particular environment within which the clutch assembly 24 is being utilized herein, that being in association with the tying mechanism of a baler, the pivotal stop 38 becomes interposed back into the path of revolution of the control arm 78 before the driven clutch part 26 and the shaft 22 have completed one rotation cycle with the driving clutch part 28. Thus, disengagement between the clutch parts 26,28 occurs after a single rotation cycle thereof has been completed.

The second pawl element 74 is provided to substantially minimize the amount by which the driven clutch part 26 may overrun the driving clutch part 28 during such single rotation cycle. The second pawl element 74 has an arm 98 which extends in a direction from pivot pin 70 generally the same as the direction of rotation of the second clutch part 28. The pivot pin 70 mounts the second pawl element 74 on the driven clutch part ear 66 for movement with the driven clutch part 26 and also for pivotal or rocking movement relative thereto. The second pawl element 74 also has a roller 100 rotatably mounted on the outer end of its arm 98 by a pin 102 and a tab portion 104 which projects radially outwardly from the outer end of the arm 98 relative to the roller pin 102.

The second pawl element 74 is normally urged to an extended position, as seen in FIG. 4, by a spring 106 which is looped at one end through an opening 108 in the tab portion 104 and at an opposite end is looped through the hole 90 in the inwardly projecting tab 92 on the lever arm 40. At the extended position, the roller 100 is disposed radially outwardly from the axis of the shaft 22 in the path of trailing lug portion 52 on the driving clutch part 28. In such position, a slight clearance is present between a side of the roller 100 and an arcuate surface 110 on the trailing lug portion 52 and, therefore, engagement will only occur between the same when the driven clutch part 26 slightly runs ahead or overruns the driving clutch part 28. This clearance is present so that the movement of the second pawl element 74 to its extended position will not interfere with the movement of the first clutch pawl 72 to its extended position which otherwise might result if the drive segment 48 has a slightly greater length along the rim 44. Thus, the clearance shown in FIG. 4 between the roller 100 and the arcuate surface 110 on the trailing lug portion 52 represents the amount by which the driven clutch part 26 may overrun the driving clutch part 28. Such amount of overrun has no adverse effect on the smooth functioning of the tying mechanism and needles when the improved clutch assembly 24 is utilized on a baler.

Interengageable means, generally designated by the numeral 112, are provided on the first and second pawl elements 72,74 to insure that the second pawl element 74 is moved from its extended position of FIG. 4 to a retracted position, as shown in FIG. 3, when the first pawl element 72 is moved from its extended position to its retracted position. At the retracted position, the roller 100 of the second pawl element 74 is disposed radially inwardly toward the axis of the shaft 22 and withdrawn or clear from any possible engagement with the drive segment 48. Limits upon the angular or rocking movement of the second pawl element 74 relative to the driven clutch part 26 are established on the one hand by the hub 58, which limits radially inward movement of the pawl element 74, and on the other hand by the inner periphery of the rim 44 of the driving clutch part 78.

It will be readily understood that, except for the provision of the interengageable means 112, there would be no positive means in the clutch assembly 24 for moving the second pawl element 74 to its retracted position. Thus, its roller 100 would continuously engage and run over the drive segment 48 of the constantly rotating driving clutch part 28 when the driven clutch part 26 is held stationary. Under such conditions, not only would the roller 100 and drive segment 48 greatly wear but also the structural integrity of the pivot pin 70 and the spring 106 would soon deteriorate.

Therefore, it is highly desirable that the second pawl element 74 pivotally move to its retracted position when the first pawl element 72 is pivotally moved to its retracted position upon disengagement of the driven clutch part 26 from the driving clutch part 28. The interengageable means 112 which insures that such action happens is, preferably, comprised by a pair of opposing lobes, nibs or ledges 114,116 respectively formed on adjacently-positioned mounting portions 118,120 of the pawl elements 72,74 at which the elements are journalled to the respective pivot pins 68,70. The configuration of the ledge 116 on the mounting portion 120 of the second pawl element 74 is in reverse to that of the ledge 114 on the mounting portion 118 of the first pawl element 72. Furthermore, as seen in FIG. 4, when the pawl element 72,74 are disposed at their respective extended position, the ledges 114,116 are disposed in a close, spaced relationship such that slight clockwise rotation of the first pawl element 72 will bring its ledge 114 into engagement with the ledge 116 on the second pawl element 74. Continued rotation of the first pawl element 72 causes the second pawl element 74 to rotate counterclockwise due to a cammingtype of action of ledge 114 against ledge 116 until the pawl elements both reach their inward retracted positions, as seen in FIG. 3. Once the pawl elements reach their retracted positions, the ledge 114 stays in engagement with the ledge 116, whereby, in effect, the first pawl element 72 being held at its retracted position by the pivotal stop 38, in turn, holds the second pawl element 74 at its retracted position. When the first pawl element 72 is released by counterclockwise movement of the pivotal stop 38, the second pawl element 74 is released and rotates clockwise as the released first pawl element 72 rotates counterclockwise, both concurrently rotating to their respective extended positions due to the bias thereon by respective springs 86,106. Furthermore, it will be seen that the spring 106 which primarily is for urging the second pawl element 74 to its extended position, also urges the first pawl element 72 to its extended position since the force of the spring 106 is transmitted by the ledge 116 against the ledge 114. Consequently, a more positive latching of the first pawl element 72 with the leading lug portion 50 is provided.

It is thought that the improved clutch assembly of the present invention and many of its attendant advantages will be understood from the foregoing description and it will be apparent that various changes may be made in the form, construction and arrangement of the parts thereof without departing from the spirit and scope of the invention or sacrificing all of its material advantages, the form herebefore described being merely a preferred or exemplary embodiment thereof.

Having thus described the invention, what is claimed is:

1. An improved clutch assembly, comprising:
   a rotatable driving clutch part having leading and trailing lug portions thereon;
   a rotatable driven clutch part journalled coaxially with said driving clutch part;
   first and second adjacent-positioned pawl elements mounted on said driven clutch part for movements between respective retracted and extended positions such that in their respective extended positions said first pawl element is disposed for driving engagement by said leading lug portion while said second pawl element is disposed for engagement with said trailing lug portion so as to prevent any substantial amount of overrun by said driven clutch part relative to said driving clutch part and in their respective retracted positions said first and second pawl elements are withdrawn from engagement with said respective lug portions;
   means urging said first and second pawl elements to their respective extended positions; and
   said first pawl element when at its retracted position, in turn, being operative to hold said second pawl element at its retracted position.

2. An improved clutch assembly, comprising:
   a rotatable driving clutch part having leading and trailing lug portions thereon;
   a rotatable driven clutch part journalled coaxially with said driving part;
   a first pawl element connected to said driven part for predetermined movement relative thereto between an extended position, wherein a portion of said first pawl element is disposed for driving engagement by said leading lug portion on said driving part for rotating said driven part with said driving part, and a retracted position, wherein said portion of said first pawl element is withdrawn from engagement with said leading lug portion on said driving part;
   first biasing means on said driven part for urging said first pawl element to its extended position;
   a second pawl element connected to said driven part for predetermined movement relative thereto between an extended position, wherein a portion of said second pawl element is disposed for engagement with said trailing lug portion on said driving part so as to prevent any substantial amount of overrun by said driven part relative to said driving part, and a retracted position, wherein said portion of said second pawl element is withdrawn from engagement with said trailing lug portion on said driving part;
   second biasing means on said driven part for urging said second pawl element to its extended position; and
   interengageable means for causing movement of said second pawl element to its retracted position when said first pawl element is moved to its retracted position.

3. An improved clutch assembly as recited in claim 2, wherein:
   said first and second pawl elements have adjacently-positioned mounting portions at which said pawl elements are respectively journalled for opposite movement between their respective retracted and extended positions; and
   said interengageable means includes a pair of opposed ledges provided on said respective mounting portions of said pawl elements such that when said first pawl element is moved from its extended position to its retracted position, said ledge on said mounting portion of said first pawl element effectuates an engaged camming action against said opposing ledge on said mounting portion of said second pawl element to cause the latter to opposite move from its extended position to its retracted position.

4. An improved clutch assembly as recited in claim 3, wherein once said pawl elements reach their respective retracted positions, said first pawl element ledge stays engaged with said second pawl element ledge, whereby said first pawl element when at its retracted position, in turn, holds said second pawl element at its retracted position.

5. An improved clutch assembly as recited in claim 2, wherein said second pawl element in being urged to its extended position by said second biasing means, in turn, urges via said interengageable means said first pawl element to its extended position.

6. An improved clutch assembly, comprising:
   a rotatable driving clutch part having leading and trailing lug portions thereon;
   a rotatable driven clutch part journalled coaxially with said driving clutch part;
   first and second adjacently-positioned pawl elements mounted on said driven clutch part for opposite pivotal movements between respective retracted and extended positions such that in their respective extended positions said first pawl element is disposed for driving engagement by said leading lug portion for rotating said driven part with said driving part while said second pawl element is disposed for engagement with said trailing lug portion so as to prevent any substantial amount of overrun by said driven clutch part relative to said driving clutch part and in their respective retracted positions said first and second pawl elements are withdrawn from engagement with said respective lug portions;

means on said driven part for urging said first and second pawl elements to their respective extended positions; and interengageable means being respectively provided on adjacent portions of said first and second pawl elements for causing pivot movement of said second pawl element to its retracted position when said first pawl element is moved to its retracted position.

7. An improved clutch assembly as recited in claim 6, wherein said interengageable means includes a pair of opposed lobes respectively provided on said adjacent portions of said pawl elements and configured such that when said first pawl element is pivotally moved from its extended position to its retracted position, said lobe on said first pawl element portion effectuates an engaged camming action against said opposing lobe on said second pawl element portions to cause said second pawl element to pivotally move from its extended position to its retracted position.

8. An improved clutch assembly as recited in claim 7, wherein once said pawl elements reach their respective retracted position, said first pawl element lobe stays engaged with said second pawl element lobe, whereby said first pawl element when at its retracted position, in turn, holds said second pawl element at its retracted position.

* * * * *